United States Patent [19]

Kago et al.

[11] 4,416,150

[45] Nov. 22, 1983

[54] FUEL INJECTION TIMING DETECTING APPARATUS FOR DIESEL ENGINES

[75] Inventors: Yoshiyuki Kago, Aichi; Sigeyuki Akita, Okazaki, both of Japan

[73] Assignee: Nippon Soken, Inc., Nishio, Japan

[21] Appl. No.: 307,934

[22] Filed: Oct. 2, 1981

[30] Foreign Application Priority Data

Oct. 22, 1980 [JP] Japan ............................... 55-146978

[51] Int. Cl.³ ............................................ G01M 15/00

[52] U.S. Cl. ................................................ 73/119 A

[58] Field of Search ...................... 73/119 A, DIG. 3; 200/DIG. 17, 67 F

[56] References Cited

U.S. PATENT DOCUMENTS 3,344,663 10/1967 Dreisin et al. .................... 73/119 A 3,851,127 11/1974 Gardner, Jr. et al. .... 200/81.9 M X

*Primary Examiner*—Jerry W. Myracle

*Attorney, Agent, or Firm*—Cushman, Darby & Cushman

[57] ABSTRACT

A fuel injection timing detecting apparatus for Diesel engines detects the displacement of a preliminarily-magnetized pressure pin which is contained in the body of a fuel injection nozzle of a Diesel engine to be moved by the pressure of pressurized fuel supply against the spring force of a pressure spring engaged with the pressure pin. The apparatus includes a magnetic sensing device externally attached to the body of the fuel injection nozzle for sensing a magnetic variation caused by the movement of the pressure pin thereby to detect the displacement of the pressure pin, and a signal processing circuit for amplifying and processing the output signal of the magnetic sensing device, whereby the apparatus is applicable to conventional fuel injection nozzles of Diesel engines without any need to modify the nozzles and makes it possible to detect easily and accurately fuel injection timings of the fuel injection nozzles.

3 Claims, 4 Drawing Figures

FUEL INJECTION TIMING DETECTING APPARATUS FOR DIESEL ENGINES

FIELD OF THE INVENTION

The present invention relates to an apparatus for detecting the fuel injection timing of a fuel injection nozzle of a Diesel engine.

DESCRIPTION OF THE PRIOR ART

It is necessary to detect accurately fuel injection timings of fuel injection nozzles in a Diesel engine to ensure proper control of the injection timings for the purpose of exhaust emission control, etc.

Figure 1:
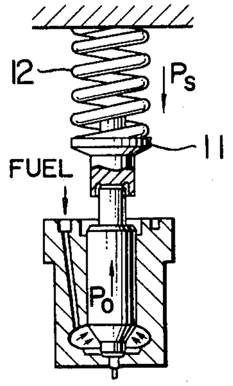
FIG. 1 is a schematic diagram showing the construction of a known type of Diesel engine fuel injection nozzle.

FIG. 1 of the accompanying drawings shows schematically the construction of a known pin type nozzle as an example of a Diesel engine fuel injection nozzle construction. When a cam of a fuel injection pump of a Diesel engine, which is not shown, is rotated to actuate a plunger of the pump, the fuel in its delivery chamber is pressurized and its fuel delivery valve is opened, thus delivering the pressurized fuel to a fuel delivery line. The fuel forced from the fuel injection pump is introduced through a fuel inlet port into an annular chamber in the nozzle body of the fuel injection nozzle shown in FIG. 1 and the fuel pressure is applied to the surface of the lower part of a nozzle needle as indicated by the arrows, thus exerting a force to push the nozzle needle upward. On the other hand, the nozzle needle is normally pressed against the valve seat of the nozzle body by the compressive force of a pressure spring 12 via a pressure pin 11. As a result, if the upward force $P_o$ caused by the fuel pressure to actuate the nozzle needle becomes greater than the compressive force Ps of the pressure spring 12, the nozzle needle leaves the valve seat to effect fuel injection. When the forced delivery of fuel from the injection pump stops and the fuel pressure decreases, the nozzle needle is returned by the compressive force of the pressure spring 12 to sit again on the valve seat, thereby completing fuel injection.

Fuel injection timing detecting apparatuses are known in the art in which, for example, a high frequency coil is disposed within an injection nozzle so that the movement of a pressure pin in the injection nozzle is detected through a change in each of the inductance and Q of the high frequency coil, which, in turn, enables the detection of the injection timing. However, the apparatuses of the above-mentioned known type are disadvantageous in that it is necessary to modify the construction of the conventional injection nozzles to effect the detection of fuel injection timings and the detection of fuel injection timings cannot be readily accomplished with the conventional injection nozzles in the existing state as they are mounted on the Diesel engine. A further disadvantage is that, since only the modified injection nozzles can be used to effect the detection of ignition timings, in order to detect the injection timings of the respective engine cylinders, it is necessary to modify the respective fuel injection nozzles, otherwise it is necessary to use a single modified injection nozzle by turns in each of the cylinders to be measured.

The present invention has been made with a view to overcoming the foregoing deficiencies of the prior art apparatuses.

SUMMARY OF THE INVENTION

It is an object of the present invention to provide a fuel injection timing detecting apparatus for Diesel engines which is constructed such that the pressure pin within a fuel injection nozzle is preliminarily magnetized and a magnetic sensor for sensing magnetic variations caused by the displacement of the pressure pin is mounted on the exterior of the injection nozzle body, thereby making it possible to detect easily and accurately the fuel injection timings of the conventional injection nozzles without modifying their construction.

DESCRIPTION OF THE PREFERRED EMBODIMENTS

The present invention will now be described with reference to FIGS. 2 to 4 of the accompanying drawings showing an example embodying this invention.

In accordance with the embodiment of the present invention shown in FIGS. 2 and 3, the illustrated fuel injection timing detecting apparatus for Diesel engines comprises a housing 20, a magnetic sensor unit or magnetic sensing device 21, printed circuit boards 22 and 23 on which there are mounted electronic circuits forming a signal processing unit or signal processing circuit 30 which will be described in detail with reference to FIG. 3, electric signal lines 24 for connecting the printed circuit boards 22 and 23 to the magnetic sensor unit 21, electric signal lines 25 for transmitting the output of the magnetic sensor unit 21 to the signal processing unit 30, a connector 26 for connecting the signal processing unit 30 to external circuits and a magnetic shielding plate 27 for shielding the interior of the fuel injection timing detecting apparatus from external magnetic fields. The magnetic sensor unit 21 and the printed circuit boards 22 and 23 having the signal processing unit 30 arranged thereon are accommodated within the housing 20 to form an integrated unit.

The housing 20 of the injection timing detecting apparatus is fixed with a nut 15, which is attached to a fuel pipe 14, to a leakage pipe 13 coupled to a nozzle body 10 made from stainless steel. A pressure pin 11 is pressed to its home position by the compressive force of a stainless steel pressure spring 12 contained in the nozzle body 10, and the pin 11 is magnetized preliminarily.

Figure 3:
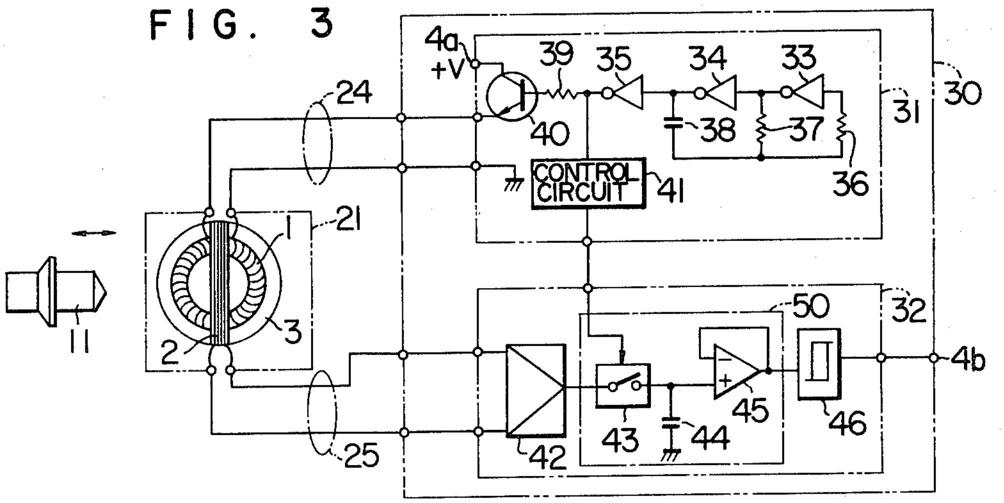
FIG. 3 shows the construction of the electric circuitry used in the apparatus according to the embodiment of the invention shown in FIG. 2.

In FIG. 3, the magnetic sensor unit 21 comprises a flux-gate type magnetometer including an excitation coil 1, a sensing coil 2 and a toroidal core 3 on which the coils 1 and 2 are wound. The excitation coil 1 is uniformly wound on the core 3 and the sensing coil 2 is wound on the excitation coil 1.

The signal processing unit 30 comprises an excitation circuit 31 for exciting the excitation coil 1 of the magnetic sensor unit 21 and a detecting circuit 32 for detecting the output of the magnetic sensor unit 21. Numeral 4*a* designates a power supply terminal of +V to be connected to an external constant-voltage power supply, and 4*b* an output terminal of the detecting circuit 32. The excitation circuit 31 comprises an astable multivibrator (oscillator circuit) which includes inverter gates 33, 34 and 35, resistors 36, 37 and 39, a capacitor 38 and a transistor 40 and a control circuit 41 for driving an analog switch 43 in the detecting circuit 32.

The detecting circuit 32 comprises an ac amplifier 42, the analog switch 43, a capacitor 44, an operational amplifier 45 and a pulse shaping circuit 46.

With the construction described above, the operation of the fuel injection timing detecting apparatus according to the present invention will now be described. An output signal of the astable multivibrator including the inverter gates 33 and 34, the resistors 36 and 37 and the capacitor 38, the waveform of which output signal is shown in (a) of FIG. 4, is applied to the excitation coil 1 of the magnetic sensor unit 21 via the transistor 40. This signal produces a great excitation field in the core 3. In this state, if a small signal field is applied from outside, a signal proportional to the waveform of the superposition of the external signal field on the excitation field is produced in the sensing coil 2 as shown in (b) of FIG. 4, and the amplitude of the signal varies with the intensity of the external signal field.

Figure 2:
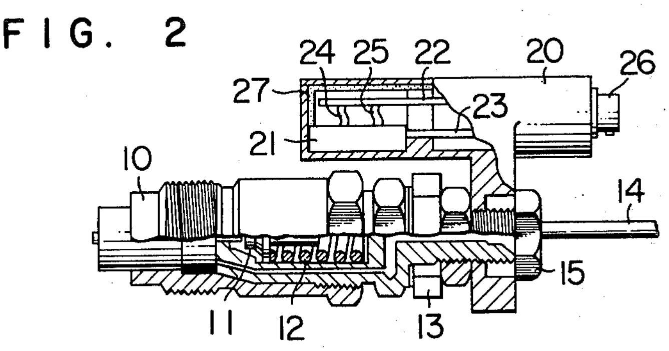
FIG. 2 is a partially sectional view showing the construction of a fuel injection timing detecting apparatus for Diesel engines according to an embodiment of the present invention.
Figure 4:
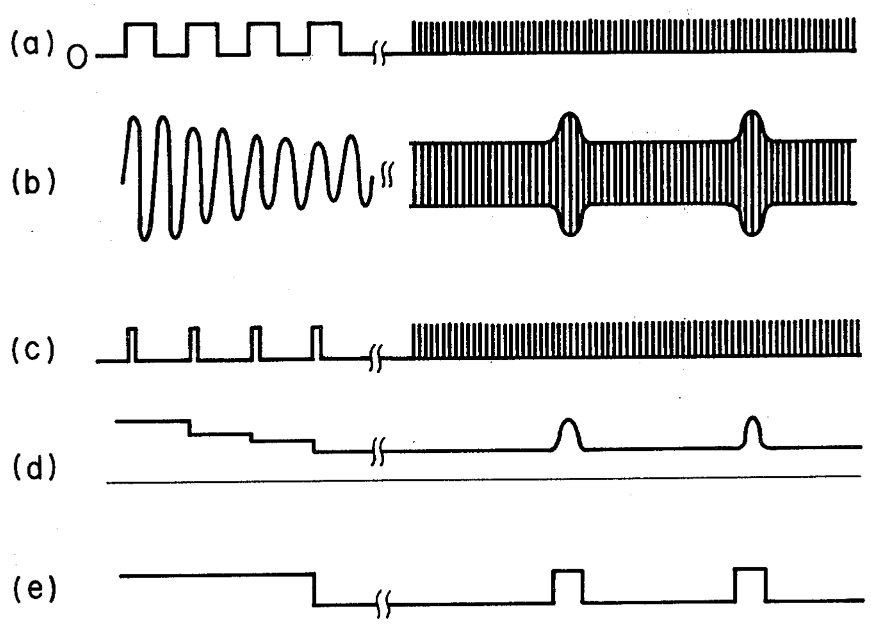
FIG. 4 shows a plurality of waveforms to be used for explaining the operation of the electric circuitry shown in FIG. 3. The left half of each of the waveforms in FIG. 4 shows on an enlarged scale a portion of the continuous waveform thereof shown in the right half.

As a result, when the fuel injection pressure increases to force the magnetized pressure pin 11 rightward in FIG. 2 and thereby the fuel injection begins, the sensing coil 2 generates an amplitude-modulated signal as shown in (b) of FIG. 4 due to an increased magnetic field caused by the movement of the pressure pin 11 approaching the magnetic sensor unit 21. The output of the sensing coil 2 is amplified through the ac amplifier 42 in the detecting circuit 32.

This amplifier signal is applied to a sampling and hold circuit 50 comprising the analog switch 43, the capacitor 44 and the operational amplifier 45 in the detecting circuit 32, which sampling and hold circuit 50 holds the applied signal during a time interval between the time when the control circuit 41 in the excitation circuit 31 has generated a drive signal shown in (c) of FIG. 4 for driving the analog switch 43 and the time when a next drive signal is generated. As a result, a signal shown in (d) of FIG. 4 appears at the output terminal of the sampling and hold circuit 50. On the basis of this signal, the pulse shaping circuit 46 forms a pulsed fuel injection timing signal shown in (e) of FIG. 4 so that it starts to rise from an initial time point when the associated magnetic variation, that is, the variation of the output signal waveform of the sampling and hold circuit 50 shown in (d) of FIG. 4 has begun to occur.

In the above-described embodiment, a conventional pressure pin 11 is utilized. However, by elongating the forward end of a conventional pressure pin or by using a modified pressure pin containing a magnet, it is possible to obtain a similar effect and also to increase the freedom of selection of the position of arrangement of the housing 20.

Further, the magnetic sensor unit 21 is not limited to the flux-gate magnetometer used in the above-described embodiment. For example, by increasing the intensity of magnetization of the pressure pin 11, it is possible to use a magnetic variation detecting device such as a Hall generator or a magneto-resistance element. Further, while, in the above-described embodiment, the injection timing signal is formed as a pulsed signal, it may be generated as an analog signal representing magnetic variations.

The fuel injection timing detecting apparatus for Diesel engines according to the invention has a great advantage such that the pressure pin 11 is forcibly magnetized preliminarily and a magnetic sensor unit is provided to detect magnetic variations caused by the displacement of the pressure pin 11 from the outside of the injection nozzle body, thereby making it possible to detect easily and accurately fuel injection timings of conventional injection nozzles without any need to modify their structure.

We claim:

1. A fuel injection timing detecting apparatus for Diesel engines comprising:

a preliminarily-magnetized pressure pin disposed within a body of a fuel injection nozzle of a Diesel engine and responsive to a pressure of pressurized fuel supply to be displaced against a spring force of a pressure spring which is in engagement with said pressure pin;

magnetic sensing means disposed outside of said fuel injection nozzle body and fixed to the same to sense a magnetic variation caused by the displacement of said pressure pin, thereby detecting the displacement of said pressure pin; and a signal processing circuit for amplifying and processing an output signal of said magnetic sensing means, wherein said magnetic sensing means comprises a flux-gate magnetometer including a toroidal magnetic core, an excitation coil and a sensing coil wound on said magnetic core;

said signal processing circuit includes an excitation circuit including an oscillator circuit for generating an exciting signal having a predetermined frequency and supplied to said excitation coil and a detecting circuit responsive to an output signal of said sensing coil to generate a detection signal indicative of a magnetic variation caused by the displacement of said pressure pin; and all the component parts of said fuel injection timing detecting apparatus other than said magnetic sensing means are magnetically shielded.

2. An apparatus according to claim 1, wherein each of said fuel injection nozzle body and said pressure spring is made of a nonmagnetic material.

3. A fuel-injection timing detecting apparatus for a Diesel engine comprising:

a fuel injection nozzle body mounted on said Diesel engine and including therein a nozzle for opening in response to the pressurized fuel to effect fuel injection, a movable member associated with said nozzle and a spring engaged with said movable member for normally biasing said nozzle in a closed position via said movable member, said movable member being magnetized to provide a magnetic field;

a magnetic sensor positioned outside said fuel injection nozzle body to be responsive to the magnetic field provided by said movable member, said magnetic sensor including a magnetic core, an excitation coil and a sensing coil wound on said core, said excitation coil being excited periodically to provide a periodic magnetic field, and said sensing coil generating an electric signal corresponding to the composite magnitude of said magnetic fields provided by said movable member and said excitation coil;

a sample-hold circuit for sample-holding said electric signal in synchronism with each excitation of said excitation coil; and a pulse circuit for generating a pulse indicative of the fuel injection timing when said sample-held electric signal reaches a predetermined level.

* * * * *